US008585978B2

(12) United States Patent  
Crucs et al.

(10) Patent No.: US 8,585,978 B2  
(45) Date of Patent: Nov. 19, 2013

(54) SENSOR CABLE RETRACTOR

(75) Inventors: Kevin M. Crucs, Copley, OH (US); Jim Dycus, San Antonio, TX (US)

(73) Assignee: Crucs Holdings, LLC, Copley, OH (US)

( * ) Notice: Subject to any disclaimer, the term of this patent is extended or adjusted under 35 U.S.C. 154(b) by 1320 days.

(21) Appl. No.: 12/171,860

(22) Filed: Jul. 11, 2008

(65) Prior Publication Data

US 2010/0006685 A1    Jan. 14, 2010

(51) Int. Cl.  
*B65H 18/28* (2006.01)

(52) U.S. Cl.  
USPC ........................................ 422/119; 242/160.4

(58) Field of Classification Search  
USPC ............................ 242/160.4; 422/22, 24, 119  
See application file for complete search history.

(56) References Cited

U.S. PATENT DOCUMENTS

| | | | | |
|---|---|---|---|---|
| 3,433,579 A | * | 3/1969 | Runnion | ................. 422/24 |
| 4,384,688 A | * | 5/1983 | Smith | ................ 242/378.2 |
| 5,453,585 A | * | 9/1995 | Lenz et al. | ............... 191/12.2 R |
| 5,552,771 A | | 9/1996 | Leyden et al. | |
| RE37,590 E | | 3/2002 | Leyden et al. | |
| 6,402,546 B1 | | 6/2002 | Groves et al. | |
| 6,461,037 B1 | * | 10/2002 | O'Leary | ....................... 374/158 |
| 2006/0115261 A1 | | 6/2006 | Nomura | |
| 2006/0177227 A1 | * | 8/2006 | Blasko et al. | ................. 398/128 |

FOREIGN PATENT DOCUMENTS

| | | |
|---|---|---|
| JP | 2003-038431 | 2/2003 |
| JP | 2003038431 A * | 2/2003 |
| JP | 2005-319083 | 11/2005 |
| JP | 2005-328882 | 12/2005 |
| JP | 2006-026021 | 2/2006 |

OTHER PUBLICATIONS

Machine Transalation of JP 2003038431 A.*

* cited by examiner

*Primary Examiner* — Walter D Griffin  
*Assistant Examiner* — Timothy Cleveland  
(74) *Attorney, Agent, or Firm* — Hahn Loeser & Parks LLP

(57) ABSTRACT

An apparatus and method for retracting and storing a sensor cable. The apparatus includes a housing operable to selectively engage a sensor cable having a cable connected to a sensor and operable to store the sensor cable in a retracted position, and a retraction mechanism capable of retracting the sensor cable to the housing without damaging the sensor.

3 Claims, 4 Drawing Sheets

SENSOR CABLE RETRACTOR

TECHNICAL FIELD

Embodiments of the present invention relate in general to the storage of cables associated with sensors, for example electronic sensors. More particularly, certain embodiments of the present invention relate to an apparatus and method for retracting and storing a sensor cable.

BACKGROUND

Sensors are often connected to other system units, such as relays or signal processing devices, by cables. In many applications, sensors are used for a specific application and then stored away until the next use, for example sensors and cables used in intraoral dentistry. In such a case, it may be necessary or desirable to also store the associated cable. In some situations, the sensor may be connected to the cable during storage, for example, so that the sensor and cable are already conveniently connected for the next use or because the sensor and the cable are integrated devices.

In order to assure that the sensor will not be damaged, cables and sensors are manually stored, requiring a user to take time and care to put the cable and sensor away, for example, in a drawer or storage cabinet. Alternatively, the cable and sensor may be hung on a wall via a hook, for example, dangling downward.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

An embodiment of the present invention comprises an apparatus for retracting and storing a sensor cable. The apparatus includes a housing operable to selectively engage a sensor cable, having a cable connected to a sensor or imaging hardware, and operable to store the sensor cable in a retracted position. The apparatus further includes a retraction mechanism capable of retracting the sensor cable to the housing without damaging the sensor. The housing may include a spool mounted on a spindle. The apparatus may further include a mount connected to the housing for mounting the housing to a wall. Alternatively, the apparatus may include a stand connected to the housing for supporting the housing.

The apparatus may also include a retraction stop for limiting an amount of retraction of the sensor cable. The apparatus may include a retraction sensor for indicating a position of the sensor cable. The apparatus may include a retraction bumper connected to the sensor cable capable of interacting with one of the housing or the retraction stop for limiting the amount of retraction.

The apparatus may include a cable retainer for selectively engaging the sensor cable. The cable retainer may include a portion of the housing defining an aperture for receiving an end of the sensor cable. Alternatively, the cable retainer may include a cable latch, or a jack for mating engagement with a connector on an end of the sensor cable.

In accordance with an embodiment of the present invention, the retraction mechanism may include a spring. Alternatively, the retraction mechanism may include a motor. The motor may move the housing relative to the sensor cable, or move the sensor cable relative to the housing. The retraction mechanism may be activated by tensioning the sensor cable, for example.

Another embodiment of the present invention comprises a sensor device and storage assembly. The sensor device and storage assembly includes a sensor cable including a cable having first and second ends with a sensor connected at the first end and one of a jack or connector connected at the second end. The sensor device and storage assembly also includes a sensor cable receiver operable to selectively engage one of the sensor or one of the jack or the connector to store the sensor cable in a retracted position. The sensor device and storage assembly further includes a sensor cable retractor capable of retracting the sensor cable to the receiver without damaging the sensor. The sensor may be disposed within the housing for retraction, for example. The sensor cable and the sensor may be integrated (permanently connected) devices, for example.

A further embodiment of the present invention comprises a method of retracting a sensor cable. The method includes providing a sensor cable with a sensor connected at one end and providing a cable receiver for selectively engaging the sensor cable. The method also includes providing a retractor for retracting the sensor cable to the cable receiver and automatically retracting the sensor cable to the cable receiver without damaging the sensor.

An infection control device for performing infection control on the sensor of the sensor cable after the sensor cable has been retracted may be provided. Also, a sterile sleeve capable of being placed over the sensor of the sensor cable to provide infection control may be provided.

These and other advantages and novel features of the claimed invention, as well as details of an illustrated embodiment thereof, will be more fully understood from the following description and drawings.

DETAILED DESCRIPTION

The following description includes reference to the field of dentistry, and in particular the acquisition of intraoral images. It must be understood, however, that the description is not to be limited generally to such a field or application. The following description of sensors and sensor cables may apply to many fields and many applications.

Figure 1:
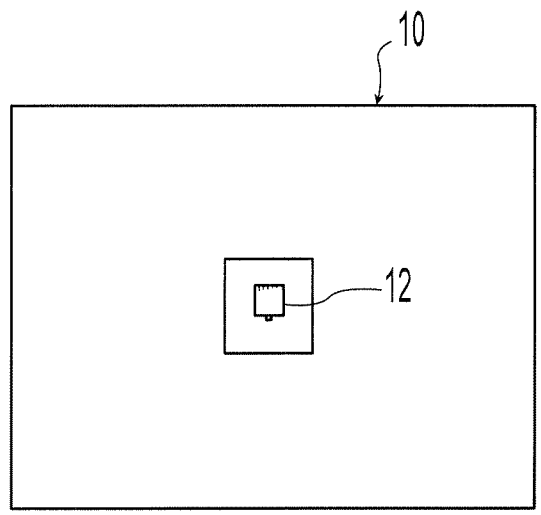
FIG. 1 is a front view of a sensor signal receiving unit.

Referring now to the drawings, there is illustrated in FIG. 1 a sensor signal receiving unit 10. The signal receiving unit 10 may be, for example, a relay for transceiving sensor signals or a signal processing and displaying device of an imaging system. The signal receiving unit 10 includes a connection jack 12 for accepting a corresponding mating connector, such as a cable plug or head. Additionally, it must be understood that the arrangement of the connection jack and corresponding mating may be chosen as desired. For example, a cable may terminate in a connection jack type fitting with a corresponding mating connector, such as a "pig tail", included on the receiving unit 10.

Figure 2:
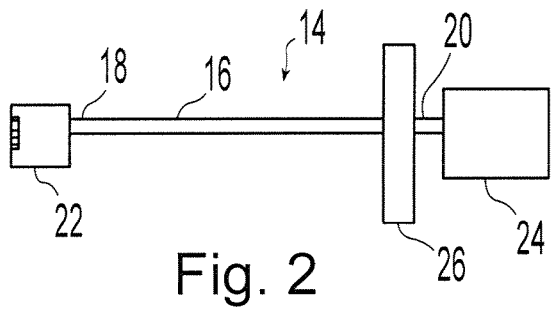
FIG. 2 is a plan view of a sensor cable assembly.

There is shown in FIG. 2 a sensor cable assembly 14. The cable assembly 14 includes a flexible cable 16 having a first end 18 and a second end 20. As used in this description, it is understood that a cable is intended to include any assembly including any medium for conducting sensor signals, such as one or more electrical wires, optical fibers or any other mechanism for conveying a sensor signal from a sensor to another device.

A connector 22 is connected at the first end 18 of the cable 16. The connector 22 is operable to cooperate with the jack 12 in order to selectively secure the cable assembly 14 to the signal receiving unit 10. Different types of connectors may be supported and/or connector converters may be provided to accommodate connecting of the connector 22 to the jack 12, in accordance with various embodiments of the present invention. Different sensors may have different connectors ranging from, for example, USB (universal serial bus) connectors to custom connectors. Various embodiments of the present invention may support such different connectors.

A sensor (or imaging hardware) 24 is connected to the second end 20 of the cable 16. For example, the sensor 24 may be an intraoral sensor used in dentistry, such as a digital x-ray sensor. The imaging hardware may be an in-line hardware that may be attached to the cable 16 but is not an actual sensor itself. As shown, the sensor 24 is integrated with the cable 16, meaning that the sensor 24 and cable 16 are not intended to be separated during normal usage. It is contemplated, however, that the sensor 24 and cable 16 may be arranged otherwise, such as with selective couplings or any other suitable arrangement. The sensor 24 is operable to provide signal(s) representative of a sensed condition to the signal receiving unit 10. Thus, in the case of an intraoral sensor, the receiving unit 10 may be an image processor or controller with an associated image display for displaying an image of the data acquired by the sensor. For example, the sensor 24 may be a CCD (charged coupled device) that generates digital signals to be stored, processed or displayed by the receiving unit 10.

The cable assembly 14 further includes an optional retraction bumper 26 disposed about the cable 16 proximate the second end 20. The purpose of the bumper 26 will be further discussed below.

Figure 3:
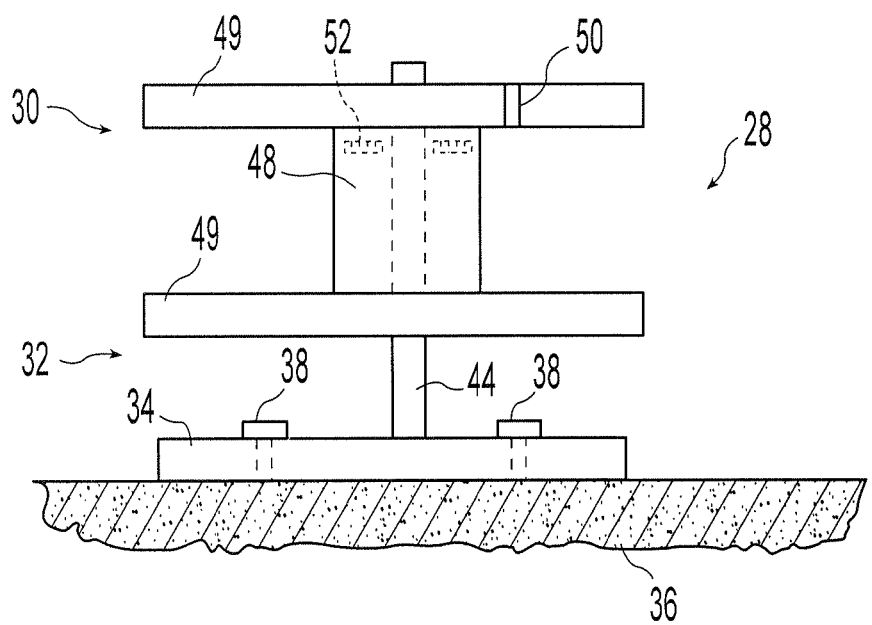
FIG. 3 is a top view of an apparatus for retracting and storing a sensor cable in accordance with a first embodiment.

A storage assembly 28 for retracting and storing the sensor cable assembly 14 is shown in FIG. 3. The storage assembly 28 includes a housing 30 and a mount 32 for supporting the housing 30. In accordance with various embodiments of the present invention, the housing may be open, closed, or partially open.

The mount 32 includes a base 34 that is secured to the wall 36 by bolts 38. It must be understood that any suitable fastening mechanism may be utilized to secure the base 34 to the wall 36. A spindle or axle 44 is secured to the base 34, for example by welding or fastening.

The housing 30 is mounted on the axle 44 for rotation about a central axis. The housing 30 includes a cable receiver in the form of a spool 48. The spool 48 also includes optional end disks 49 to provide retaining walls for a cable spooled therebetween. The spool 48 includes a cable retainer in the form of a slot 50 formed in one of the end disks 49 to selectively engage the cable assembly 14 and secure it to the housing 30 via, for example, a press fit. The retainer 50 may however be any suitable fastening device such as hooks or ties or any other devices suitable to secure the cable assembly 14 to the housing 30.

A retractor/retraction mechanism in the form of a loaded spring mechanism 52 is disposed within the housing 30 and functions to revolve the housing 30 about the axle 44.

In operation, the first end 18 of the cable assembly 14 passes through the slot 50 and is secured to the housing 30. The spring mechanism 52 is activated to revolve the housing 30 about the axle 44, and thus retracts the cable 16 to the spool 48. For example, the spring mechanism 52 may be activated by tensioning the sensor cable 16 and thus applying tension to the spring mechanism 52 through the spool 48. The spring 52 is set such that the movement of the cable will not be so sudden or forceful as to damage the sensor 24.

Upon retraction, the optional bumper 26 may engage the end disks 49 and stop the retraction of the cable 16 relative to the housing 30. Thus, the cable 16 is retracted without the risk of the sensor 24 being damaged by abruptly colliding with the housing 30. When a user desires to employ the sensor cable assembly 14 once again, the user may simply pull and unwind the sensor cable assembly 14 from the apparatus 28 by, for example, pulling on the stop 26.

Figure 4:
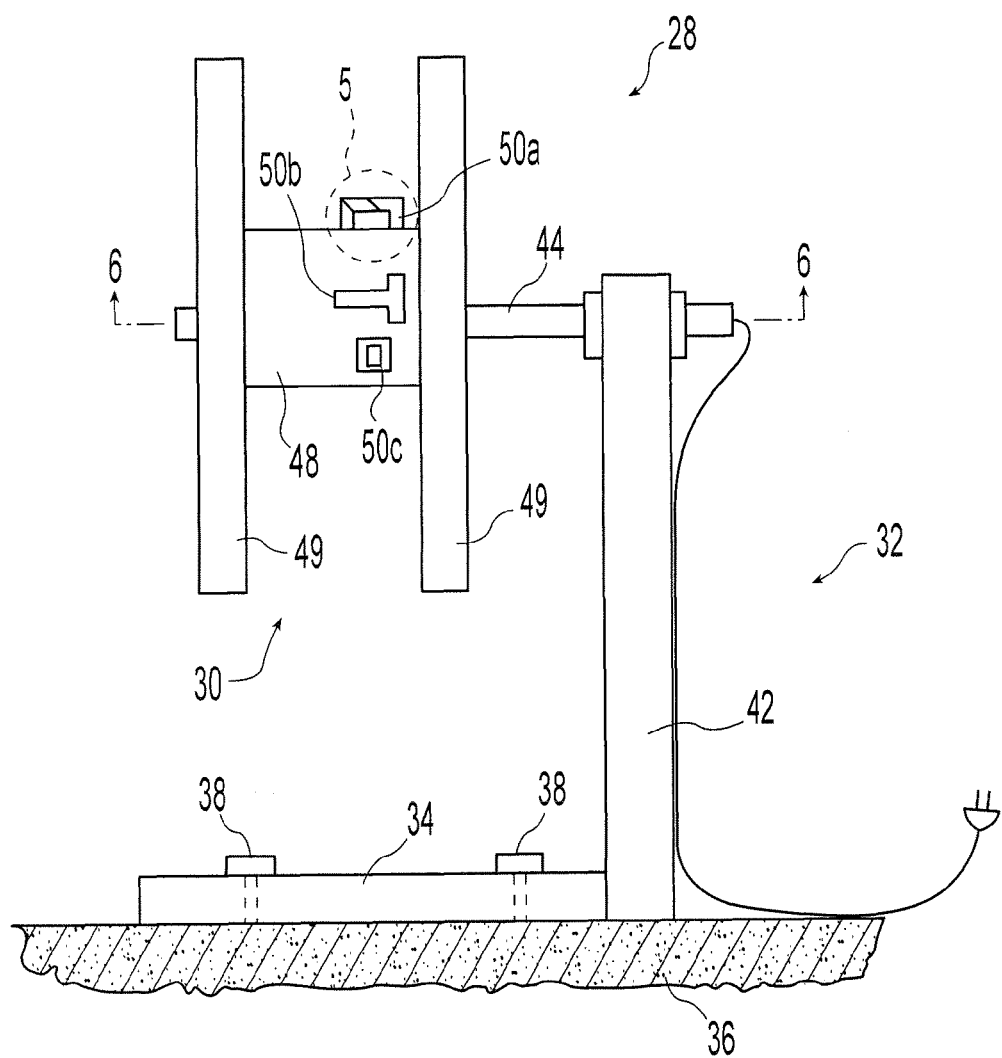
FIG. 4 is a top view of an apparatus for retracting and storing a sensor cable in accordance with a second embodiment.

There is shown in FIG. 4 a second embodiment of the apparatus 28 where similar components are labeled with similar identifiers. The apparatus 28 includes a wall mount 32 for supporting a housing 30. The wall mount 32 includes a base plate 34 anchored to a wall 36 by fasteners in the form of bolts 38, although it must be understood that the base plate 34 may be anchored to the wall 36 in any suitable manner. A support arm 42 is secured to the base plate 34 and supports a spindle or axle 44.

The housing 30 is mounted on the axle 44 for rotation about a central axis. The housing 30 includes a cable receiver in the form of a spool 48. The spool 48 includes a plurality of optional cable retainers in the form of a latch 50a, an aperture 50b, and a jack 50c to selectively engage the cable assembly 14 at or toward an end 18 or 20 of the cable assembly and secure the cable assembly 14 to the housing 30.

Figure 5:
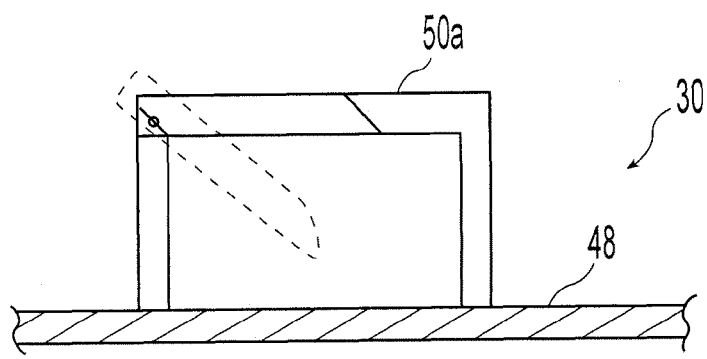
FIG. 5 is an enlarged view of the latch shown in FIG. 4.

The jack 50c is configured to accept the connector 22 and secure the cable assembly 14 to the spool 48. The aperture 50b is formed in the body of the spool 48 and shaped to accept at least one of the connector 22 and the sensor 24 such that when the connector 22 or the sensor 24 is placed inside the housing 30 the cable assembly 14 may be selectively secured to the housing 30. As best shown in FIG. 5, latch 50a is a spring loaded latch mechanism that may be depressed to accept the sensor cable 16 and retain one of the connector 22 and the sensor 24 on one side thereof. The cable assembly 14 may be released by again depressing the latch 50a.

Figure 6:
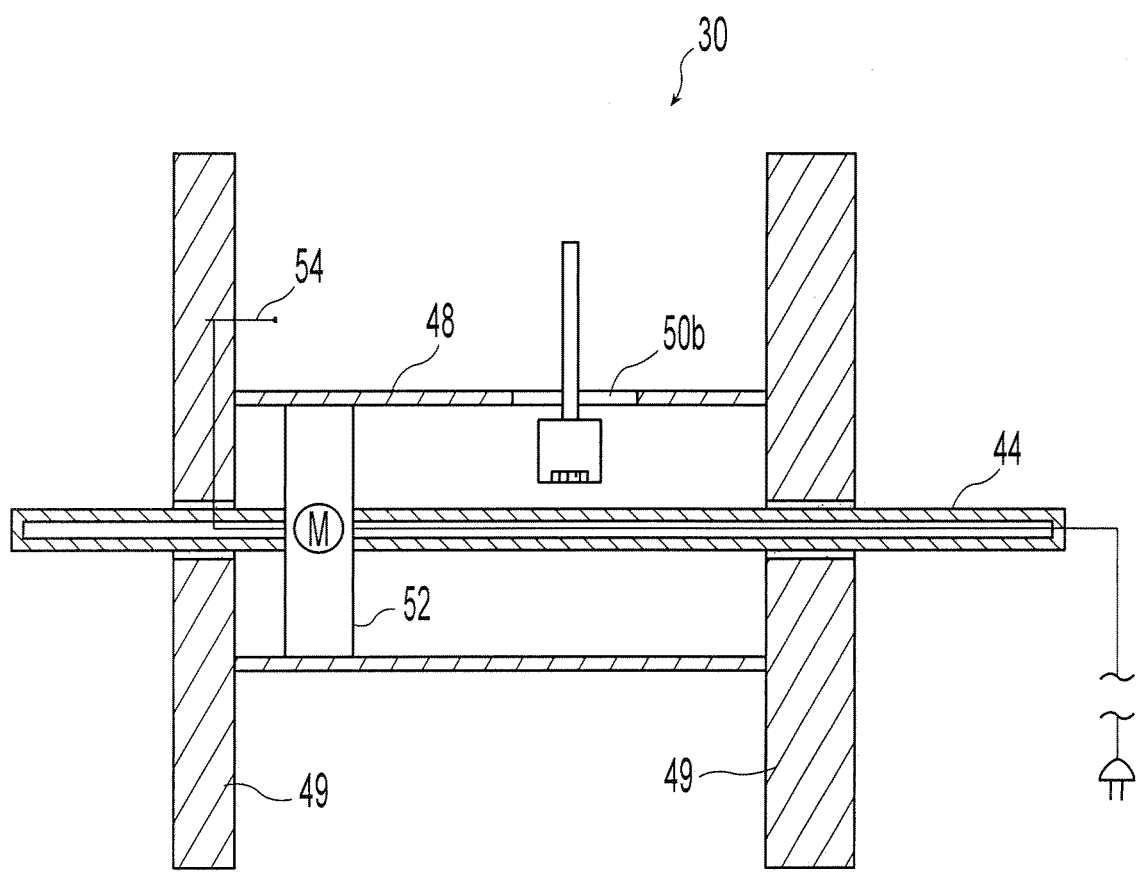
FIG. 6 is a sectional view of a portion of the apparatus of FIG. 4 taken along line 6-6.

FIG. 6 shows, instead of a spring mechanism, a retractor/retraction mechanism in the form of a motor 52 in accordance with another embodiment. The motor 52 is disposed within the housing 30 and functions to revolve the housing 30 about the axle 44. An optional retraction sensor 54 for indicating a position of the sensor cable is connected to the motor 52. The motor may be automated to stop the retraction of the cable 16 based at least in part upon a signal from the retraction sensor 54 indicative of a position of the cable 16.

In operation, motor 52 is activated to revolve the housing 30 about the axle 44, and thus retracts the cable 16 to the spool 48. For example, the motor 52 may be activated by a switch or by a signal from the retraction sensor 54 or by tensioning the sensor cable 16 and thus applying feedback to the motor 52 through the spool 48. The motor 52 is set such that the movement of the cable will not be so sudden or forceful as to damage the sensor 24. Retraction is stopped without the risk of the sensor 24 being damaged. The sensor cable assembly 14 may be removed from the housing 30 by pulling or by reversing the direction of rotation of the motor, for example.

Figure 7:
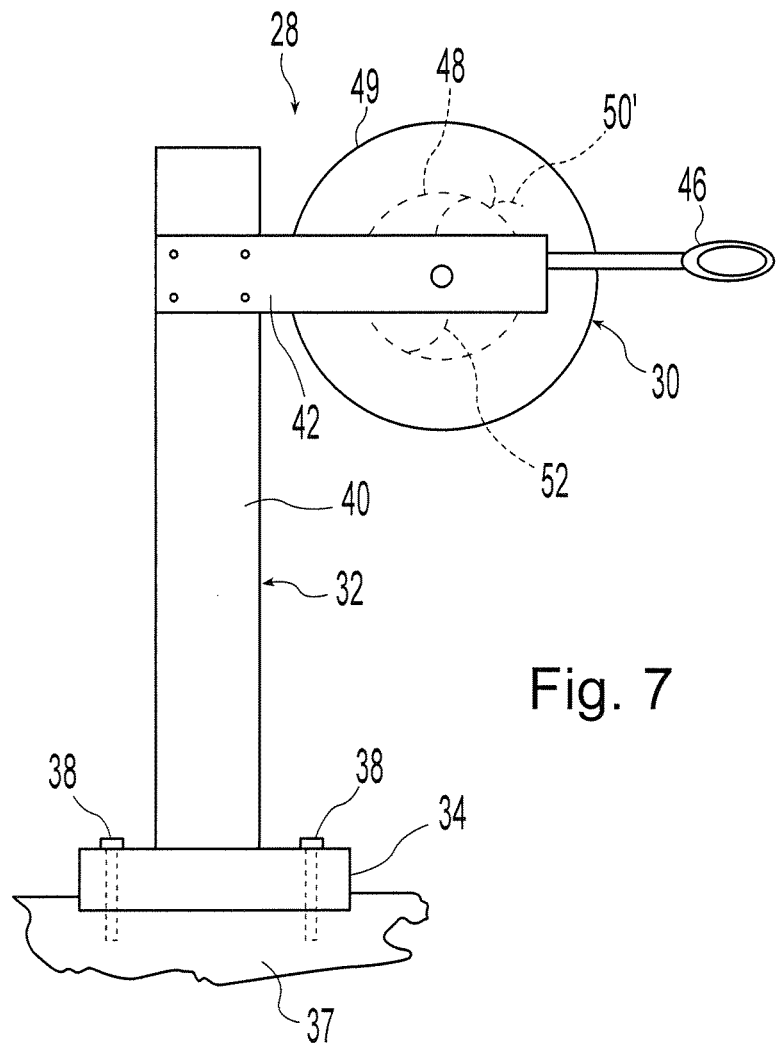
FIG. 7 is a side view of an apparatus for retracting and storing a sensor cable in accordance with a third embodiment.

There is shown in FIG. 7 a third embodiment of the apparatus 28 where similar components are labeled with similar identifiers.

The apparatus 28 includes a mounting stand 32. The stand 32 includes a base 34 that is optionally secured to the floor or ground 37 by bolts 38. A vertical post 40 is secured to the base 34, for example, by welding or fastening. A horizontal support arm 42 extends from the post 40 and supports a spindle or axle 44. The spool 48 includes a cable retainer in the form of fasteners 50' to selectively engage the cable assembly 14 and secure to the housing 30. The fasteners 50' may be hooks or ties or any other devices suitable to secure the cable assembly 14 to the housing 30. A stop ring 46 extends from the support arm 42. In operation, the cable 16 may pass through the ring 46. Upon retraction the bumper 26 will engage ring 46 at a stopping point.

Figure 8:
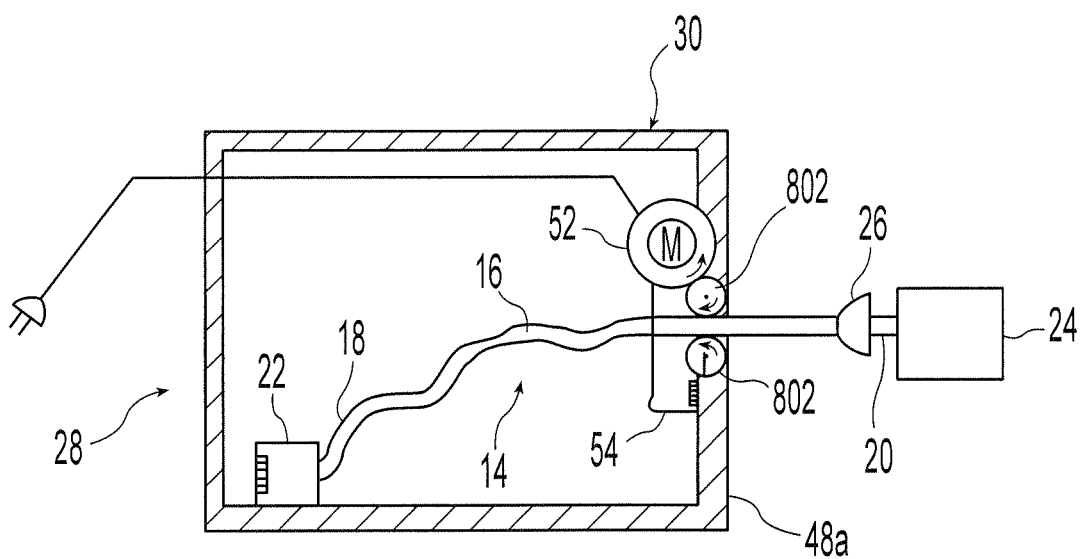
FIG. 8 is a side sectional view of an apparatus for retracting and storing a sensor cable in accordance with a fourth embodiment.

There is shown in FIG. 8 a fourth embodiment of the apparatus 28 where similar components are labeled with similar identifiers.

The apparatus 28 includes a housing 30 including a box 48a. A motor 52 is disposed within the box 48a for moving the sensor cable 16 relative to the housing 30 via a pair of rollers 802 operationally connected to the motor 52, and storing the sensor cable 16 inside the box 48a. A spring sensor 54 indicates when the pair of rollers 802 have been separated by presenting the connector 22 between the pair of rollers 802. A signal from the sensor 54 to the motor 52 activates the motor 52, causing the pair of rollers 802 to pull the sensor cable 16 into the box 48a. When the stop 26 hits the box 48a at the entrance of the pair of rollers 802, the resultant resistance on the pair of rollers 802 causes the motor 52 to stop. As such, the sensor cable 16 is fully retracted into the box except for the stop and sensor 24. A user may subsequently grab and pull slightly on the stop 26 to activate the motor 52 in a reverse direction, causing the pair of rollers 802 to rotate in an opposite direction to extract the cable sensor 16 from the box 48a.

One embodiment of a method of retracting the sensor cable 16 includes providing the sensor cable 16 with the sensor 24 connected at one end, providing the cable receiver 48 for selectively engaging the sensor cable 16, providing the retractor 52 for retracting the sensor cable 16 to the cable receiver 48, and automatically retracting the sensor cable 16 to the cable receiver 48 without damaging the sensor.

In accordance with an embodiment of the present invention, infection control may be provided. For example, the housing 30 may be fitted with an infection control device such as a UV (ultraviolet) light or other sterilizing agent that is capable of performing infection control on the sensor after the sensor has been retracted. Alternatively, or in addition, a sterilized auto fitting sensor sleeve may be provided to fit over and cover the sensor before the sensor is, for example, placed in a patient's mouth in order to provide infection control.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A sensor device and storage assembly comprising:
   a sensor cable including a cable having first and second ends with a sensor connected at the first end and one of a jack and connector connected at the second end;
   a sensor cable receiver operable to selectively engage one of the sensor and the jack or the connector to store the sensor cable in a retracted position; and
   a sensor cable retractor capable of automatically retracting the sensor cable to the receiver upon activation by a user without damaging the sensor.

2. The assembly of claim 1 where the sensor is connected to said sensor cable retractor for retraction.

3. The assembly of claim 1 where the sensor cable and the sensor are integrated devices.

\* \* \* \* \*